US012222933B2

(12) United States Patent
Hermogenes et al.

(10) Patent No.: US 12,222,933 B2
(45) Date of Patent: Feb. 11, 2025

(54) SYSTEM AND METHOD FOR MANAGEMENT SYSTEM DATA AGGREGATION AND TRANSFORMATION USING CLIENT-SPECIFIC CRITERIA

(71) Applicant: OPTX Solutions, LLC, Las Vegas, NV (US)

(72) Inventors: Jerome Hermogenes, Las Vegas, NV (US); Michael Roy Hartwig, Las Vegas, NV (US)

(73) Assignee: OPTX Solutions, LLC, Las Vegas, NV (US)

( * ) Notice: Subject to any disclaimer, the term of this patent is extended or adjusted under 35 U.S.C. 154(b) by 130 days.

(21) Appl. No.: 17/150,611

(22) Filed: Jan. 15, 2021

(65) Prior Publication Data

US 2021/0224262 A1      Jul. 22, 2021

Related U.S. Application Data

(60) Provisional application No. 62/962,084, filed on Jan. 16, 2020.

(51) Int. Cl.
| | |
|---|---|
| *G06F 16/242* | (2019.01) |
| *G06F 16/21* | (2019.01) |
| *G06F 16/2455* | (2019.01) |
| *G06F 16/25* | (2019.01) |
| *G06N 20/00* | (2019.01) |

(52) U.S. Cl.
CPC ........ *G06F 16/2443* (2019.01); *G06F 16/212* (2019.01); *G06F 16/24556* (2019.01); *G06F 16/258* (2019.01); *G06N 20/00* (2019.01)

(58) Field of Classification Search
CPC .......... G06F 16/2443; G06F 16/24556; G06F 16/212; G06F 16/258; G06N 20/00
USPC ....................................................... 707/756
See application file for complete search history.

(56) References Cited

U.S. PATENT DOCUMENTS

| | | | |
|---|---|---|---|
| 6,247,008 B1 * | 6/2001 | Cambot | G06F 16/2428 |
| | | | 707/999.005 |
| 8,862,537 B1 * | 10/2014 | Kurtic | G06F 21/606 |
| | | | 707/602 |
| 9,798,788 B1 * | 10/2017 | Reiner | G06F 16/254 |

(Continued)

OTHER PUBLICATIONS

International Searching Authority, Search Report and Written Opinion for International Application No. PCT/US21/13604, Mailed Apr. 5, 2021; 12 pages.

*Primary Examiner* — Giovanna B Colan
(74) *Attorney, Agent, or Firm* — BakerHostetler

(57) ABSTRACT

A method may include receiving, at a first time, an instruction to execute a stored procedure at a database system, retrieving a schema of a structure of a database used by a management system of a client entity, determining an identity of a management system and a type of data to retrieve for the client entity. The method may also include, responsive to determining the identity and the type of data to retrieve, determining a criteria to use in a dynamic query based on the identity and the type of data to retrieve. The method may also include, responsive to determining the criteria, generating, in the stored procedure, the dynamic query comprising the criteria, and executing the stored procedure to retrieve raw data from the database used by the management system and transform the raw data to transformed data using the dynamic query.

18 Claims, 7 Drawing Sheets

(56) References Cited

U.S. PATENT DOCUMENTS

| | | | | |
|---|---|---|---|---|
| 10,453,165 | B1* | 10/2019 | Kostov | G06N 20/00 |
| 11,966,396 | B1* | 4/2024 | Finnerty | G06F 16/2433 |
| 2004/0044665 | A1* | 3/2004 | Nwabueze | G06F 16/9535 |
| | | | | 707/999.009 |
| 2007/0156792 | A1* | 7/2007 | D'Souza | G06F 11/2041 |
| 2008/0021893 | A1* | 1/2008 | Bakalash | G06F 16/24556 |
| 2016/0005197 | A1* | 1/2016 | Walker | G06F 16/258 |
| | | | | 345/440 |
| 2018/0336198 | A1* | 11/2018 | Zhong | G06N 3/08 |
| 2019/0370370 | A1* | 12/2019 | Wittern | G06F 16/24556 |
| 2020/0026710 | A1* | 1/2020 | Przada | G06F 16/254 |
| 2020/0160229 | A1* | 5/2020 | Atcheson | G06N 20/00 |

* cited by examiner

SYSTEM AND METHOD FOR MANAGEMENT SYSTEM DATA AGGREGATION AND TRANSFORMATION USING CLIENT-SPECIFIC CRITERIA

CROSS-REFERENCE TO RELATED APPLICATIONS

This application claims the benefit of U.S. Provisional Application Ser. No. 62/962,084 filed Jan. 16, 2020 titled "System and Method for Management System Data Aggregation and Transformation Using Client-Specific Criteria." The provisional application is incorporated by reference herein as if reproduced in full below.

TECHNICAL FIELD

This disclosure relates to a database system. More specifically, this disclosure relates to a system and method for management system data aggregation and transformation using client-specific criteria.

BACKGROUND

Entities, such as corporations, law firms, companies, and/or any business operation, may generate massive amounts of data. For example, an entity may operate multiple casinos and/or multiple hotels at different locations in the same or different geographical locations. There may be different systems that are used to manage the casino and the hotel. Within the different systems, there may be different categories of data that is generated and stored in databases. Some of the categories may include information pertaining to food and beverage, players, hotel reservations, awards, table ratings, slot ratings, kiosk offers, gaming points, and the like. The entities may desire to view the data that is stored in the databases to generate various reports and/or to perform analytics using the data.

SUMMARY

Representative embodiments set forth herein disclose various techniques for enabling a system and method for management system data aggregation and transformation using client-specific criteria.

In one embodiment, a method may include receiving, at a first time, an instruction to execute a stored procedure at a database system, retrieving a schema of a structure of a database used by a management system of a client entity, determining an identity of a management system and a type of data to retrieve for the client entity. The method may also include, responsive to determining the identity and the type of data to retrieve, determining a criteria to use in a dynamic query based on the identity and the type of data to retrieve. The method may also include, responsive to determining the criteria, generating, in the stored procedure, the dynamic query comprising the criteria, and executing the stored procedure to retrieve raw data from the database used by the management system and transform the raw data to transformed data using the dynamic query.

In some embodiments, a tangible, non-transitory computer-readable medium storing instructions that, when executed, cause a processing device to perform one or more of the operations described above. In some embodiments, a system may include a memory storing instructions and a processor communicatively coupled to the memory. The processor may execute the instructions to perform one or more of the operations described above.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
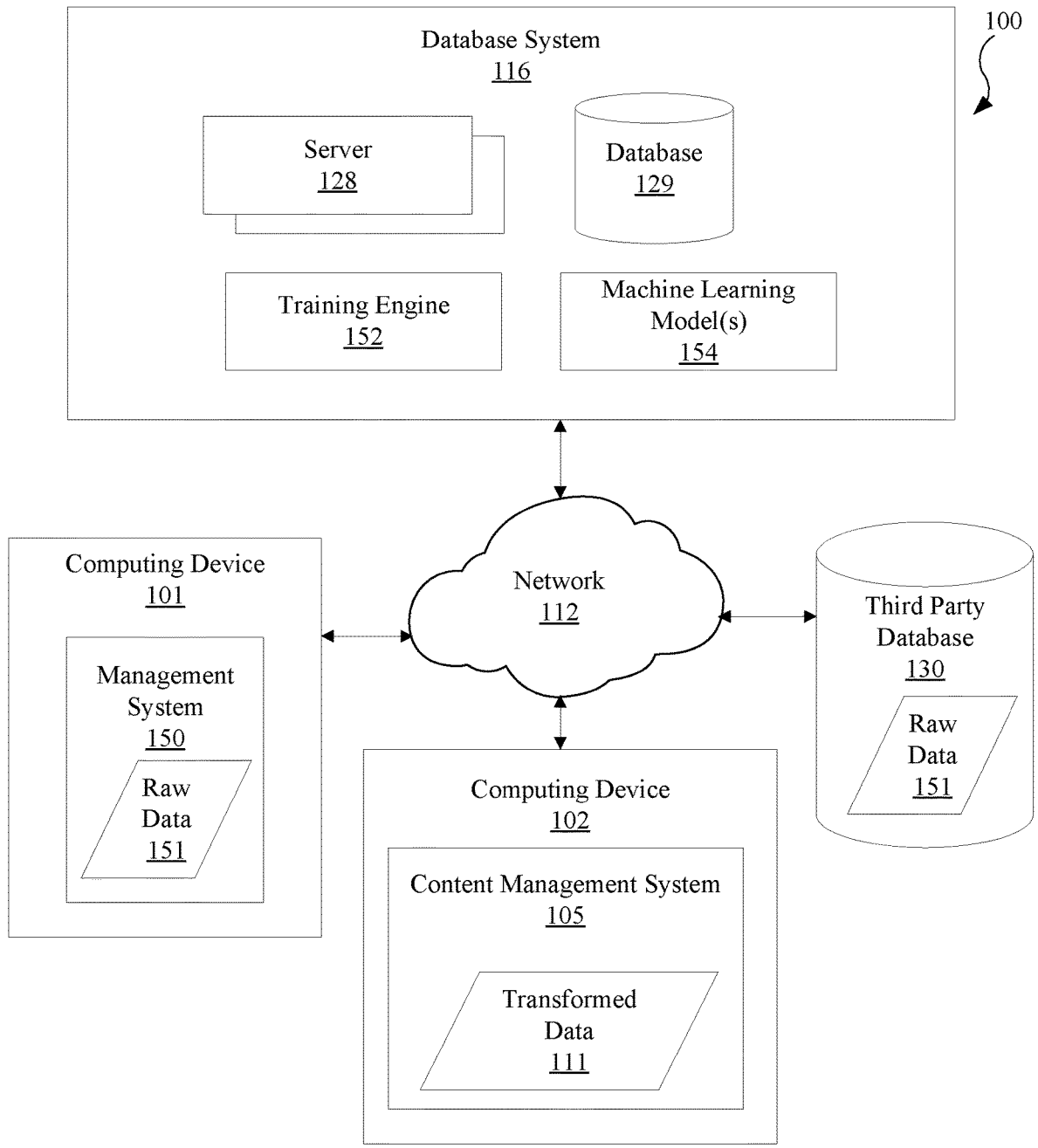
FIG. 1 illustrates a high-level component diagram of an illustrative system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The term "client entity" may refer to an organization that operates at least one management system to which the database system is communicatively connected.

The term "raw data" may refer to data stored in a first format by a management system used by a client entity.

The term "transformed data" may refer to data transformed to a second format based on a criteria tailored for a client entity.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

Client entities, such as casinos, hotels, companies, corporations, and/or any suitable organization, may utilize management systems to operate their businesses. For example, the management systems may include types such as casino management systems, hotel management systems, food and beverage management systems, and the like. The management systems used by the client entities may be different instances of the same type or may be different types altogether. The management systems may generate and/or store a multitude of raw data in various formats in various sources (e.g., databases, database collection objects (tables), flat files, comma separated values (CSV) files and other delimited files, text files, spreadsheet files, etc.).

The client entities may also use a content management system that may optimize file and document management lifecycle and/or improve business operations. The content management system may perform predictive data analytics that allow a user to take action based on predicted results. For example, the predictive analytics may track business operations, files, records, and tasks and recommend which should be reviewed to improve an outcome.

It may be inefficient and/or infeasible for the content management system to receive a multitude of raw data in various formats from various sources used by the management systems of a single client entity and/or multiple client entities. However, to perform analysis and/or generate reports from the raw data stored by the management systems, it is desirable to provide the content management system with data from the management systems where the raw data is transformed to be compatible with a schema of a database used by the content management system in an efficient manner in terms of processing time, memory usage, and/or network usage.

Accordingly, embodiments of the present disclosure may relate to a database system capable of obtaining raw data from various management systems used by various client entities, transforming the raw data into transformed data, and providing the transformed data to be used by a content management system. The database system may be schema-agnostic with regard to the data source of the management systems from which the raw data is obtained. Any suitable schema may be used by the data sources of the management systems, and the disclosed techniques may enable efficient extraction, transformation to a uniform schema of a content management system, and loading to the content management system. The database system may use criteria that are either predefined or generated using artificial intelligence based on the a type of data to extract specified in the schemas, the type of management systems, and/or the client entities.

The disclosed techniques may use a single job (e.g., stored procedure) that identifies the schemas of the various data sources of the various management systems and determines which criteria to use to retrieve and/or transform the raw data to comply with a schema used by the content management system. The stored procedure may implement workflows to simultaneously extract and transform similar types of raw data from the management systems and to load the transformed data to the content management system. The disclosed techniques improve processing of data aggregation and migration over conventional systems that use numerous stored procedures that operate sequentially (e.g., back to back) to extract, transform, and load data.

For example, the database system may collect raw data or information from one or more sources of one or more management systems used by the client entities. The database system may connect to the management system via a secure network connection, virtual private network, or tunnel. The database system may execute a stored procedure to retrieve the raw data and store the raw data in a database of the database system.

The raw data that is collected may be processed to transform the raw data to transformed data using a criteria that is tailored for a particular data type, management system, and/or client entity. For example, two client entities may use the same type of management system but define the names of fields for the same type of data differently. Accordingly, the criteria may specify to transform the same type of raw data from the management systems of the two client entities using the respective name of the field for each. To that end, dynamic queries may be generated using the different criteria of the respective client entities when the same type of data is being retrieved. In some embodiments, the same type of raw data from the management systems of the two client entities may use the same naming convention. In such an instance, the same criteria may be used in the dynamic query generated for those client entities.

As noted above, parallel processing may be used in the present disclosure to obtain and/or transform the data. For example, a workflow for each type of data to be retrieved may execute in parallel simultaneously instead of sequentially. Such parallel processing may improve time efficiency of retrieving and/or processing efficiency by reducing the amount of time the processing devices are executing to retrieve, transform, and/or load the data. The retrieved data may be stored in an appropriate table in the database of the database system and transformed in accordance with the criteria for the different client entities, data types, and/or management systems. The transformed data may be loaded into a database associated with the client entities. The database to which the transformed data is loaded may be the same or a different database than the database from which the raw data was retrieved.

The disclosed techniques provide numerous benefits over conventional systems. The techniques may provide for a database system that is schema-agnostic with regards to the management systems from which the raw data is extracted, transformed, and loaded to a content management system. The techniques may improve efficiency of extracting data from management systems and/or sources used by the management systems, transforming the data, and loading the data to content management systems. Further, the disclosed techniques may reduce processing resources used by reducing the amount of time a processing device is executing to retrieve the data by using parallel processing. The disclosed techniques may enable interoperability between multiple different management systems having different formats of raw data by transforming the raw data based on a client-specific criteria to a unified format used by a schema of a content management system.

FIG. 1 illustrates a high-level component diagram of an illustrative system architecture 100 according to certain embodiments of this disclosure. In some embodiments, the system architecture 100 may include a computing device 101, a computing device 102, a database system 116, and/or a third party database 130 that are communicatively coupled via a network 112. As used herein, a database system refers, without limitation, to any remote or distal computing system accessed over a network link. Each of the computing device 101 and computing device 102 may include one or more processing devices, memory devices, and network interface devices.

The network interface devices of the computing devices 101 and 102 may enable communication via a wireless protocol for transmitting data over short distances, such as Bluetooth, ZigBee, near field communication (NFC), etc. Additionally, the network interface devices may enable communicating data over long distances, and in one example, the computing device 101 and/or 102 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The computing device 101 may be any suitable computing device, such as a laptop, tablet, smartphone, server, or computer. The computing device 101 may run a management system 150 (referred to as a "source application" herein) that is implemented in computer instructions stored on a memory device and that is executed by a processing device. The management system 150 may have a certain type, such as a hotel management system, a casino management system, a food and beverage management system, and the like. The management system 150 may generate and/or store raw data 151 that is used by the management system 150. The raw data 151 may have a first format for the type of raw data 151, the naming convention of the raw data 151, the size of the raw data 151, and so forth. The first format may be configured by a client entity that sets up the management system 150 to operate on the computing device 101.

Although just one computing device 101 is shown, it should be understood that there may be numerous computing devices 101 operated by numerous client entities. Each of the computing devices 101 may run the same type of management systems 150 and/or different types of management systems 151. Accordingly, the first format of the raw data 151 may differ between the same types of management systems 150 executing on the computing devices 101 or the first format of the raw data may be the same between the same types of management systems 150. The first format of the raw data 151 may be defined in a first schema that specifies the structure of the raw data 151. The raw data 151 may be stored in one or more databases, one or more database collection objects, one or more flat files, one or more CSV file and/or other delimited files, one or more text files, one or more spreadsheet files, or the like. The raw data 151 may be related to player information, reservation information, point information, food and beverage information, awards information, gaming information, preference information, and so forth.

In some embodiments, the third party database 130 may be hosted on a separate computing device that is in communication with the computing device 101 running the management system 150. The raw data 151 used by the management system 150 may be stored in the third party database 130 which may function as a source of the raw data 151 for the management system 150. In some embodiments, the third party database 130 may be hosted by the computing device 101.

The computing device 102 may execute a content management system 105. The content management system 105 may be implemented in computer instructions stored on the one or more memory devices of the computing device 102 and executable by the one or more processing devices of the computing device 102. The content management system 105 may be any suitable software application that is capable of managing content, improving business workflow, analyzing data, and making predictions. The content management system may receive transformed data 111 from the database system 116. As described further herein, the transformed data 111 may be transformed using a criteria that is specific to a client entity. The criteria may categorize, map, and/or translate the raw data 151 in a first format to the transformed data 111 in a second format. In some embodiments, the first format and the second format are different. For example, a first client entity may use the name "f and b" for food and beverage information in the raw data 151 generated using a first type of management system 150 and a second client entity may use the name "food and bev" for food and beverage information in the raw data 151 generated using the first type of management system 150. The criteria for the first client entity may specify mapping "f and b" in the first format to 'food and beverage" in the second format for the transformed data 111 and criteria for the second client entity may specify mapping "food and bev" in the first format to "food and beverage" in the second format for the transformed data 111.

In some embodiments, the database computing system 116 may include one or more servers 128 that form a distributed, grid, and/or peer-to-peer (P2P) computing architecture. Each of the servers 128 may include one or more processing devices, memory devices, data storage, and/or network interface devices. The servers 128 may be in communication with one another via any suitable communication protocol. The servers 128 may use a schedule stored in a database 129 to execute a job (e.g., stored procedure) on a periodic basis, predetermined basis, and/or on-demand basis. The database 129 may be hosted by one of the servers 128 and there may be more than one database 129 that are deployed to perform the disclosed techniques. The servers 128 may execute job to gather raw data 151 from each management system 150 and/or sources (e.g., third party database 130) that are used by the client entities, transform the raw data 151 to transformed data 111 to be used by the content management system 105, and load the transformed data 111 to a database used by the content management system 105. In some embodiments, the raw data 151 is transformed using, in the job, a generated dynamic query that uses the criteria specifically tailored for the client entity, the type of management system 150, and/or the type of data.

In some embodiments, the database computing system 116 may include a training engine 152 and/or one or more machine learning models 154. The training engine 152 and/or the one or more machine learning models 154 may be communicatively coupled to the servers 128 or may be included in one of the servers 128. In some embodiments, the training engine 152 and/or the machine learning models 154 may be included in the computing device 101 and/or 102.

The one or more of machine learning models 154 may refer to model artifacts created by the training engine 152 using training data that includes training inputs and corresponding target outputs (correct answers for respective training inputs). The training engine 152 may find patterns in the training data that map the training input to the target output (the answer to be predicted), and provide the machine learning models 154 that capture these patterns. The set of machine learning models 154 may comprise, e.g., a single level of linear or non-linear operations (e.g., a support vector machine [SVM]) or a deep network, i.e., a machine learning model comprising multiple levels of non-linear operations. Examples of such deep networks are neural networks including, without limitation, convolutional neural networks, recurrent neural networks with one or more hidden layers, and/or fully connected neural networks.

In some embodiments, the training data may include inputs of data formats of raw data 151 used by management systems 150 and correlated outputs of a criteria to use in a dynamic query. The training data may also include other inputs, such as types of management systems 150, types of data, types of content management systems 150, schemas for structure of databases, and so forth that correspond to correlated outputs of a criteria to use in a dynamic query.

In some embodiments, the trained machine learning model 154 may receive an input of a schema defining a structure (e.g., first format) of raw data and output a criteria for one or more of the raw data to transform the raw data to a structure (e.g., second format) specified in a second schema. In some embodiments, the machine learning models 60 are linked such that their outputs are used as inputs to one another.

In some embodiments, the database system 116 may include an application programming interface (API) that communicatively couples to the third party database 130 via the network 112. The API may be implemented as computer instructions stored on one of the servers 128 and executed by a processing device of one of the servers 128. The third party database 130 may store raw data 151 The API may extract the raw data 151 from the third party database 130 to perform the techniques disclosed herein.

Figure 2:
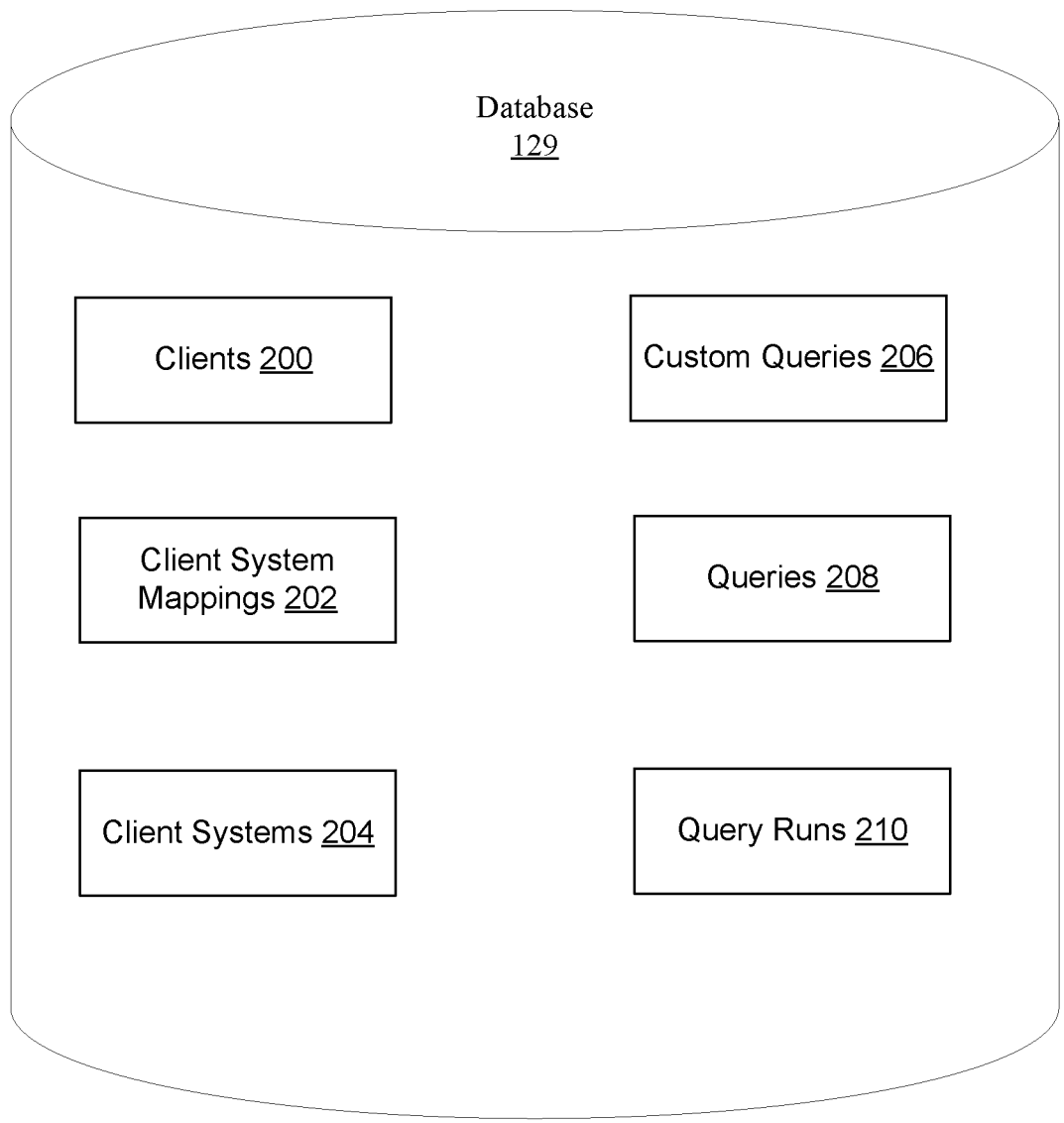
FIG. 2 illustrates a block diagram of tables in a database according to certain embodiments of this disclosure.

FIG. 2 illustrates a block diagram of tables in a database 129 according to certain embodiments of this disclosure. The tables may include a clients table 200, a client system mappings table 202, a client systems table 204, a custom queries table 206, a queries table 208, a query runs table 210. In some embodiments, any suitable number of tables may be used to implement the disclosed techniques. The tables may be composed of records and fields that hold data, using a model of vertical columns and horizontal rows. Each of the tables may include a primary key that is a unique identifier for every row in each respective table. In some embodiments, the tables may each include one or more secondary keys that link to the primary keys in other tables.

In some embodiments, the clients table 200 may contain data about a client entity, such as the name, address, phone number, a region, a country, a database name, a schema name, a created by, a creation timestamp, a modified by, a modified timestamp, an active state, a language, a primary key, a parent identification, etc. The clients table 200 may store data for each client entity operating a management system 150 that is communicatively coupled to the database system 116.

In some embodiments, the client system mappings table 202 may contain data about which management system the client entities use. The client system mappings table 202 may associate the client entities and the management systems with which the client entities use. For example, the data in the client system mappings table 202 may include a primary key, a management system identification, a client entity identification, a link name (e.g., name of a content management system to which the management system is linked), etc. A single client entity (e.g., Hard Rock® Casino) may be associated with multiple management systems. For example, the single client entity may use a hotel management system and a casino management system that are mapped accordingly in the client system mappings table 202. To that end, the same type of management system may be mapped to multiple different client entities in the client system mappings table 202. For example, a management system having type A may be mapped to multiple different client entities in the client system mappings table 202.

In some embodiments, the client systems table 204 may contain data about a third-party database management systems (referred to as "management systems" herein) the client entities use. The management systems may include a casino management system, a hotel management system, a food and beverage management system, and the like. It should be noted that a particular type of management system is not exclusive to a specific client entity but can be used by multiple client entities as separate instances. For example, different instances of the same casino management system (e.g., casino management system A) may be used for different client entities. The data in the client system mappings table 202 may include a management system name, a management system version, a management system purpose, a created by, a creation timestamp, a modified by, a modification timestamp, etc.

In some embodiments, the custom queries table 206 may contain data about custom queries that a specific client entity uses to request data that is present in its own database, and does not exist in another client entity's database. The custom queries may be located in the custom queries table 206, which is separate from the queries table 208.

In some embodiments, the queries table 208 contain data about the queries on how to retrieve and process each data from the management system used by the client entity and/or a source database used by the management system of the client entity. A query may refer to a set of instructions and criteria that is used to request for data and/or information from a database. The custom queries table 206 may include data for a management system identification, a primary key, a query tag, a query text, etc. The management system identification may identify the client entity's management system from where data is to be gathered. As previously noted, the management system information is stored in the client systems table 204. The query tag may refer to a note for each particular query text that identifies what type of data the query will retrieve from a client entity's management system. The query text may refer to a predefined or dynamically generated criteria (e.g., SQL statements) from a table and/or database collection object using query strings and/or query methods to categorize the data. The query text may be unique for each management system of each of the client entities. In some embodiments, the query text may be the same for the same type of management system of different client entities.

For example, some client entities may store data for food and beverage using different naming conventions and/or data types. One client entity may refer to the data as "f and b" while another client entity may refer to the data as "food and beverage" in the same type of food and beverage management system. Thus, the query text may be tailored for certain management systems, certain types of data, and/or certain client entities. In another example, different client entities may refer to the data as "food and beverage" for the same type of food and beverage management system. In such a case, the same query text may be defined and/or dynamically created for the different client entities.

TABLE 1

| Id | SystemId | Query Tag | Query Text |
|----|----------|-----------|------------|
| 1 | 2 | Player | DECLARE @Run . . . |
| 3 | 4 | Hotel Arrivals | DECLARE @Run . . . |

TABLE 2

| Id | SystemName | System Version | SystemPurpose |
|----|------------|----------------|---------------|
| 2 | Management System A | 1 | Casino Management System |
| 4 | Management System B | 1 | Hotel Management System |

The following description is provided for explanatory purposes. As depicted above, Table 1 is an example queries table 208 and includes a first row with Id 1 that contains instructions in QueryText (e.g., criteria) on how to retrieve and transform Player level data (QueryTag) from SystemId 2. By cross referencing the client systems table 204 depicted by Table 2, SystemId 2 corresponds to a row having a SystemName, "Management System A", and having a SystemPurpose, "Casino Management System".

Further, as depicted above, Table 1 includes a second row with Id 3 that contains instructions in QueryText (e.g., criteria) on how to retrieve and transform HotelArrivals level data (QueryTag) from SystemId 4. By cross referencing the client systems table 204 depicted by Table 2, SystemId 4 corresponds to a row having a SystemName, "Management System B", and having a SystemPurpose, "Hotel Management System".

In some embodiments, the query runs table 210 may include data that stores the last run date of the job (e.g., stored procedure). When a schedule specifies the job is to execute at a second time later than the last run date of the previous time the job ran, the job may gather raw data that was created after the last run date of the job. That is, just raw data that was subsequently created, based on timestamps, after the job ran the previous time may be retrieved, transformed, and loaded to the database used by the content management system 105.

Figure 3:
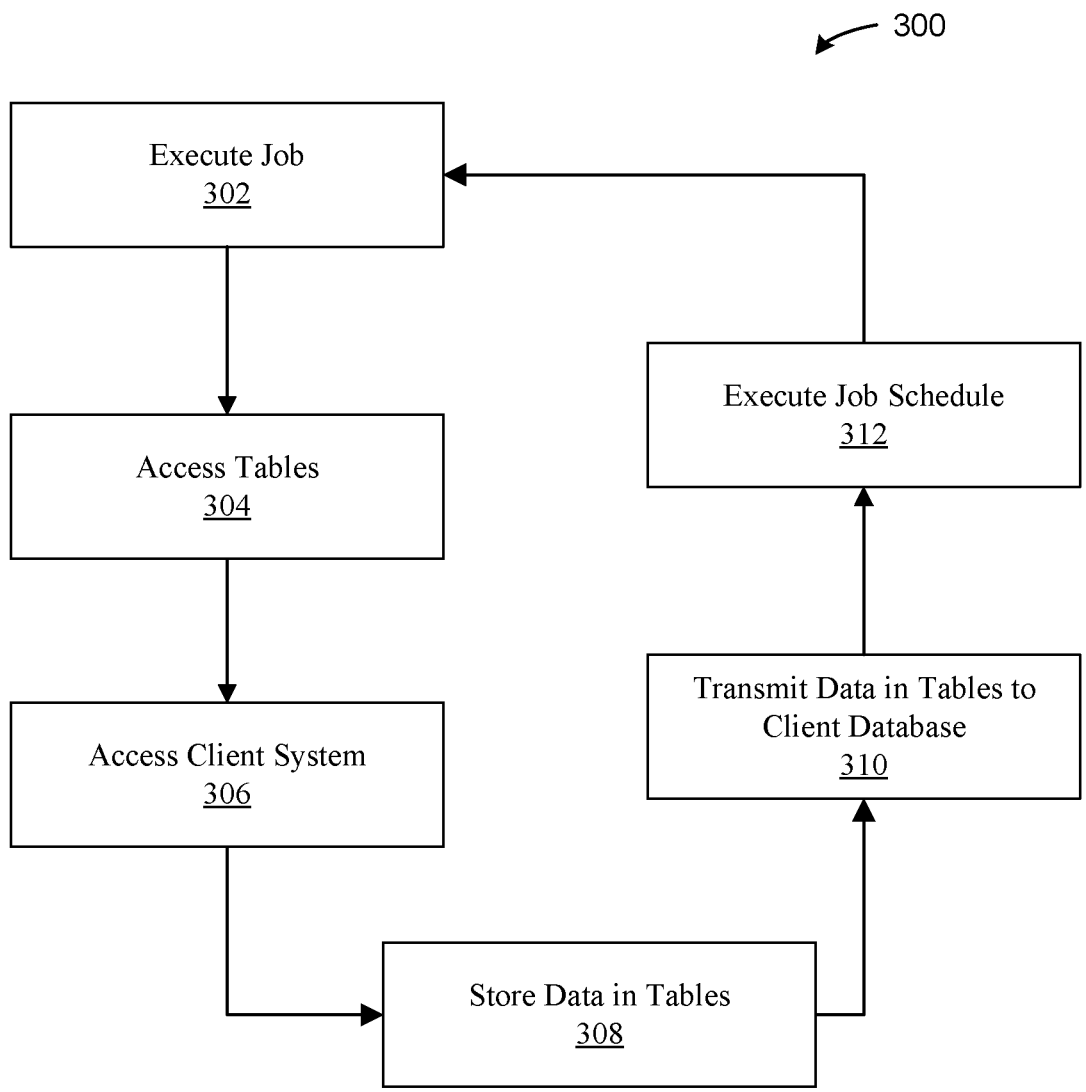
FIG. 3 illustrates a block diagram of an example data flow according to certain embodiments of this disclosure.

FIG. 3 illustrates a block diagram 300 of an example data flow according to certain embodiments of this disclosure. At block 302, the database system 116 may execute the job (e.g., stored procedure) at a first time. The stored procedure may include information pertaining to (i) how to retrieve raw data 151 from one or more management systems 150 or sources (e.g., third party database 130) of one or more client entities, (ii) which client entities for which to extract raw data 151, (iii) which management systems 150 are used by the client entities, and/or (iv) the schemas defining structures of databases used by the client entities, among other information.

At block 304, the database system 116 may access the tables 200, 202, 204, 206, 208, and 210 in the database 129 to obtain additional instructions, identify which type of data to retrieve, and/or identify the criteria to use to generate a dynamic query for the particular client entity, management system, and/or data type.

At block 306, execution of the stored procedure by the database system 116 may cause the database system 116 to access the management systems 150 and/or sources of the client entities. The database system 116 may retrieve the raw data 151 from the management systems 150 and/or the sources of the client entities via a secure network connection, virtual private network, or a tunnel.

At block 308, the retrieved raw data 151 may be stored on the database 129 at a location designated for raw data 151. As previously discussed, the raw data 151 may have varying data formats for different management systems and/or client entities. In some embodiments, the database system 116 may transform the raw data 151 to the transformed data 111 using a particular criteria that is tailored for a specific client entity prior to storing the transformed data 111 in the database 129. In some embodiments, the database system 116 may store the raw data 151 in the database 129 and transform the raw data 151 into transformed data 111 prior to loading the transformed data 111 into the database used by the content management system 105.

An example criteria may perform various transformation functions such as converting a value having a source parameter name in a data source (e.g., database, collection objection, file, etc.) to a target parameter name in a data target. For example, a data field named "MEMBERSHIP_CARD_NO" that is used by the management system 150 of a client entity may be transformed to a data field named "PlayerId" for storage in a database of a content management system having a second schema. The criteria of each client entity may categorize the raw data 151 to the transformed data 111 based on the type of management system 150 and/or type of data to be transformed.

At block 310, the database system 116 may transmit the transformed data 111 from the database 129 to a respective database used by the content management system 105 of the respective client entity. The transformed data 111 may conform to a schema of a structure of the database used by the content management system 105 and may be stored in the database.

At block 312, the database system 116 may execute a job schedule that is set in a task and/or applications job schedule of an operating system executing on one of the servers 128. The database system 116 may return to block 302 to execute the job again. The database system 116 may retrieve just the raw data 151 that is created after a last run date of the previous job execution.

Figure 4:
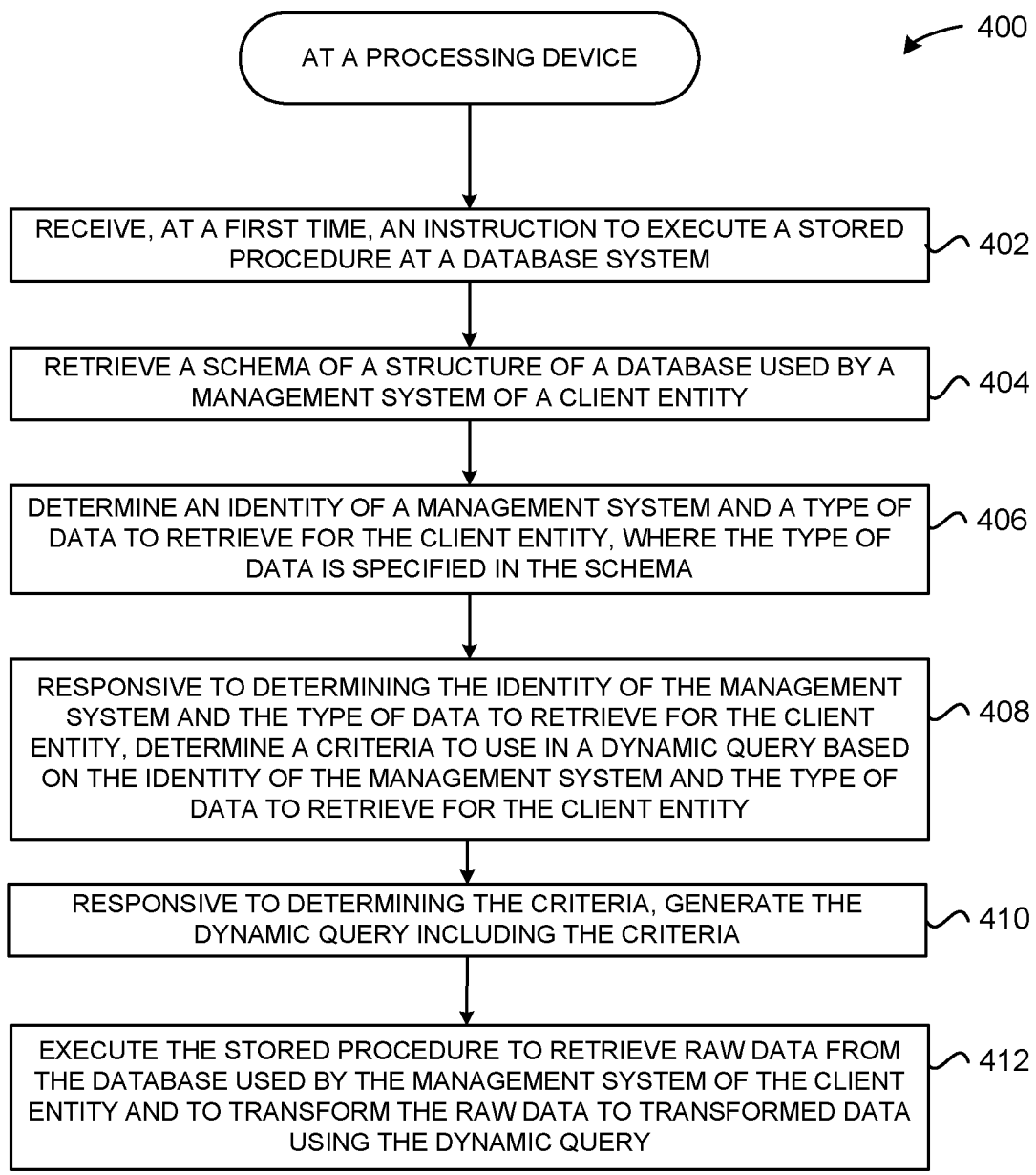
FIG. 4 illustrates example operations of a method for generating a dynamic query using a criteria for a client entity according to certain embodiments of this disclosure.

FIG. 4 illustrates example operations of a method 400 for generating a dynamic query using a criteria for a client entity according to certain embodiments of this disclosure. The method 400 may be performed by processing logic that may include hardware (circuitry, dedicated logic, etc.), software, or a combination of both. The method 400 and/or each of their individual functions, subroutines, or operations may be performed by one or more processing devices of a computing device (e.g., any component (server 128) of database system 116 of FIG. 1) implementing the method 400. The method 400 may be implemented as computer instructions stored on a memory device and executable by the one or more processing devices. In certain implementations, the method 400 may be performed by a single processing thread. Alternatively, the method 400 may be performed by two or more processing threads, each thread implementing one or more individual functions, routines, subroutines, or operations of the methods.

At block 402, a processing device may receive, at a first time, an instruction to execute a stored procedure at a database system 116. In some embodiments, the instruction may be received periodically based on a schedule running via an operating system of the database system 116, and the processing device may store a last run date for when the stored procedure is executed.

At block 404, a processing device may retrieve a schema of a structure of a database used by a management system 150 (e.g., hotel management system, casino management system, food and beverage management system, etc.) of a client entity. The schema may be specified in the stored procedure and/or dynamically determined by querying the management system 150 of the client entity.

At block 406, a processing device may determine an identity of a management system 150 and a type of data to retrieve for the client entity, where the type of data is specified in the schema. Example types of data may include player information, reservation information, gaming information, rewards information, food and beverage information, etc.

At block 408, responsive to determining the identity of the management system 150 and the type of data to retrieve for the client entity, a processing device may determine a criteria to use in the dynamic query based on the identity of the management system and the type of data to retrieve for the client entity. As discussed herein, the criteria may be specifically tailored for a client entity based on the identity of the management system 150 and the type of data to retrieve for the client entity.

At block 410, responsive to determining the criteria, a processing device may generate the dynamic query including the criteria. Generating the dynamic query may include assigning a value to a parameter in the dynamic query with the criteria. For example, a dynamic query may be represented as the following: "SELECT @SQL=QueryText, @QueryId=Id FROM table.Queries WHERE SystemId=@CMSSystemId and QueryTag='Adjustments'". The "QueryText" may represent the criteria, the "QueryId" may represent an identifier of the query, the "SystemId" may represent the identifier of the management system 150 and the "QueryTag" may represent the type of data a query may retrieve from a management system 150. The SQL statement may select the QueryText at the appropriate field in the queries table 208.

At block 412, a processing device may execute the stored procedure to retrieve data from the database used by the management system 150 of the client entity and to transform the raw data 151 to transformed data using the dynamic query. In some embodiments, the processing device may transform the data into transformed data based on a second schema of a second structure of a second database used by the content management system 105 of the client entity. The processing device may store the transformed data in the database 129 in raw data format prior to transformation or after the raw data 151 is transformed into transformed data 111.

Figure 5:
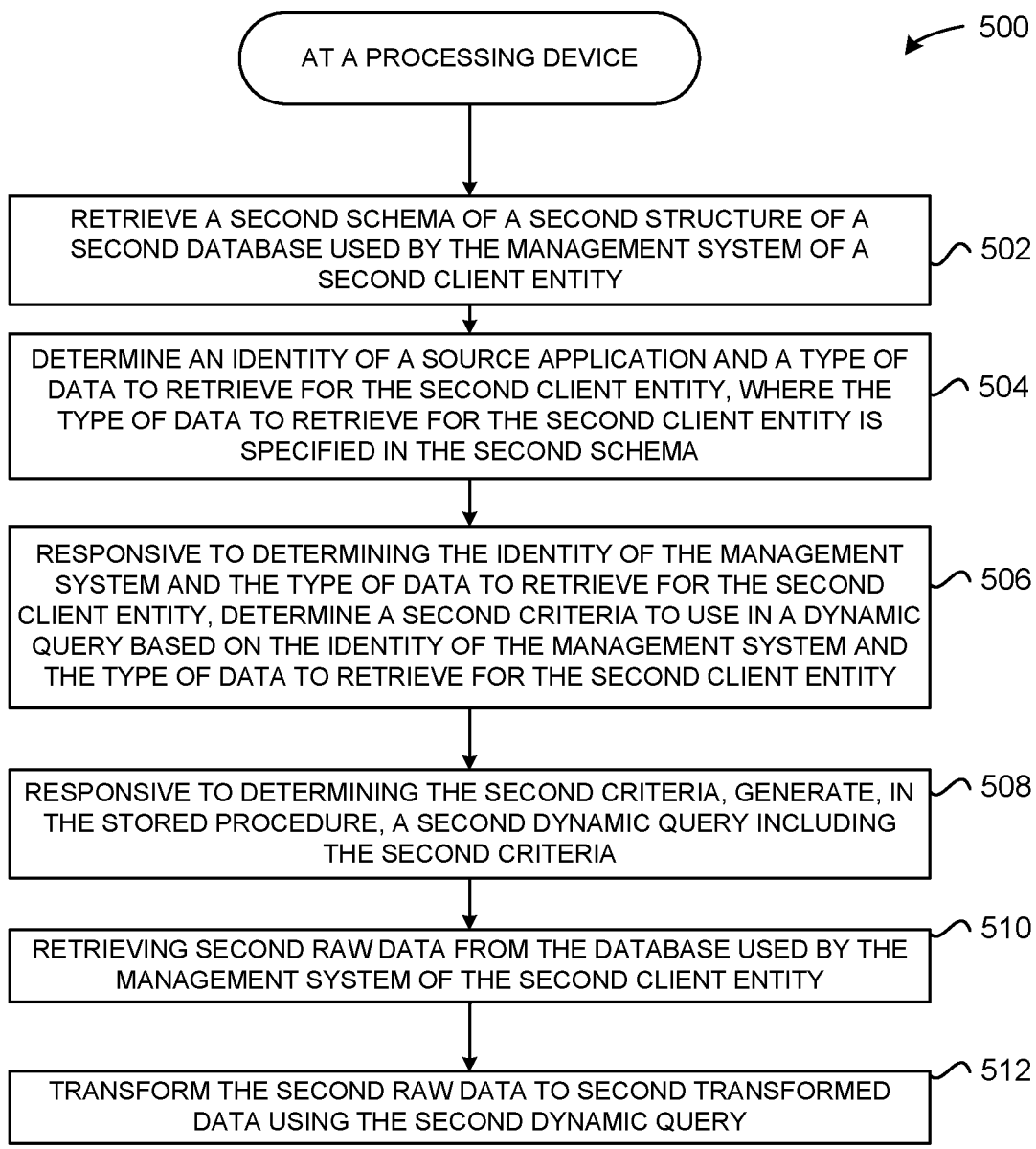
FIG. 5 illustrates example operations of a method for generating a second dynamic query using a second criteria for a second client entity according to certain embodiments of this disclosure.

FIG. 5 illustrates example operations of a method 500 for generating a second dynamic query using a second criteria for a second client entity according to certain embodiments of this disclosure. Method 500 includes operations performed by processors of a computing device (e.g., computing device 101, any component (server 128) of database system 116 of FIG. 1) implementing the method 500. In some embodiments, one or more operations of the method 500 are implemented in computer instructions that stored on a memory device and executed by a processing device. The method 500 may be performed in the same or a similar manner as described above in regards to method 400. The operations of the method 500 may be performed in some combination with the operations of the method 400 described above with reference to FIG. 4.

At block 502, a processing device may retrieve a second schema of a second structure of a second database used by the management system 150 (e.g., the same type of management system 150 as in FIG. 4) of a second client entity (e.g., different than the first client entity in FIG. 4).

At block 504, a processing device may determine the identity of the management system 150 and the type of data to retrieve for the second client entity, where the type of data to retrieve for the second client entity is specified in the second schema. The identity of the management system 150 may be the same as the identity of the management system used by the client entity in FIG. 4.

At block 505, responsive to determining the identity of the management system and the type of data to retrieve for the second client entity, a processing device may determine a second criteria to use in the dynamic query based on the identity of the management system and the type of data to retrieve for the second client entity. If the identity of the management system in FIG. 4 is the same as the identity of the management system in FIG. 5, and the type of data to retrieve for the client entity in FIG. 4 and the second client entity in FIG. 5 are the same, then the first and second criteria may be the same. If the identity of the management system in FIG. 4 and the identity of the management system in FIG. 5 are the same, but the type of data to retrieve for the client entity in FIG. 4 is different from the type of data to retrieve for the client entity in FIG. 5, then the criteria in FIG. 4 may be different than the second criteria in FIG. 5.

At block 510, responsive to determining the second criteria, a processing device may generate a second dynamic query including the second criteria. Generating the second dynamic query may include assigning a value to a parameter in the dynamic query with the second criteria. In some embodiments, the criteria and the second criteria may be different. In some embodiments, the criteria may be the same.

At block 512, a processing device may execute the second dynamic query to retrieve second data from the database used by the management system of the second client entity. In some embodiments, the processing device may execute the dynamic query and the second dynamic query using a workflow designed to execute the dynamic query and the second dynamic query in parallel to retrieve the data and the second data both having the type of data. For example, SQL Server Integration Services (SSIS) may be used to execute the dynamic queries in parallel. In some embodiments, a separate dynamic query may be generated for each type of data to retrieve from the management systems. If there are 5 of the same type of managements systems that include a data type for player information, 5 different dynamic queries may be generated (with the same or different criteria) to retrieve the player information in parallel using a workflow designed for player information. Such a workflow layer may reduce processing resource consumption by executing the dynamic queries in each workflow in parallel.

Figure 6:
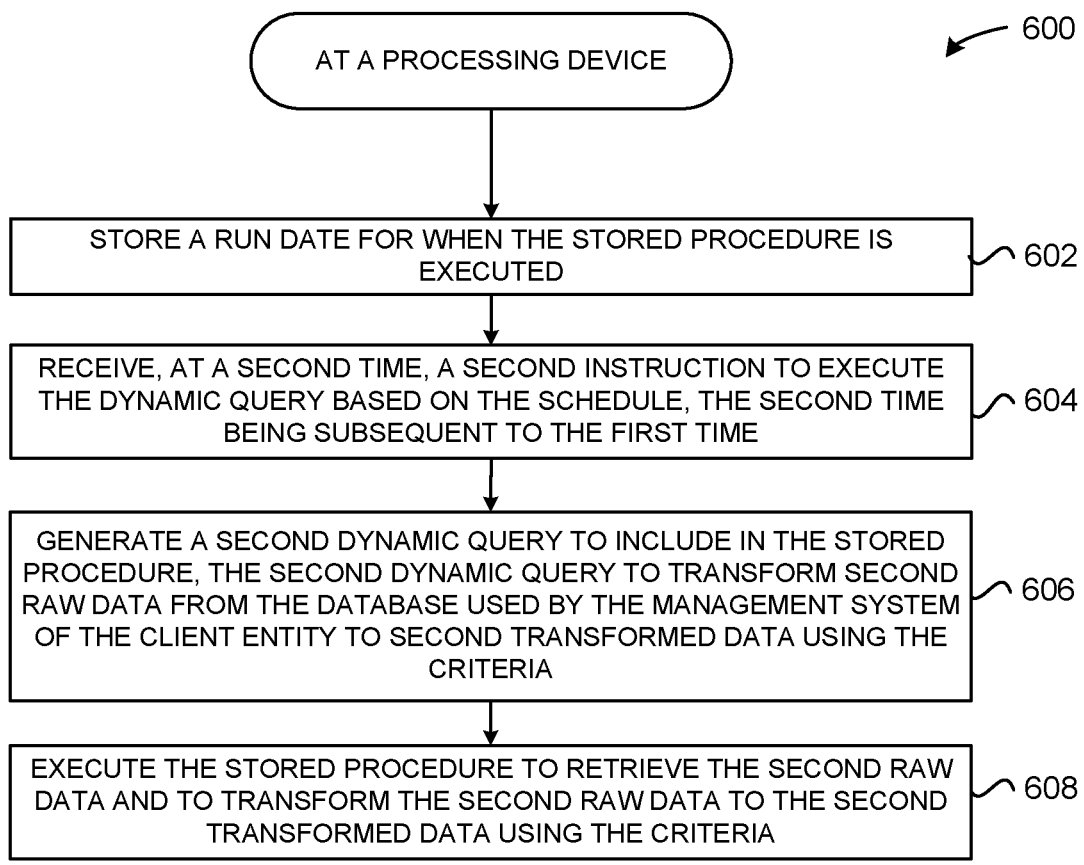
FIG. 6 illustrates example operations of a method for executing, at a second time, the stored procedure to retrieve second data that is created after a run date the stored procedure executed a first time according to certain embodiments of this disclosure.

FIG. 6 illustrates example operations of a method 600 for executing, at a second time, the stored procedure to retrieve second data that is created after a run date of the stored procedure executed a first time according to certain embodiments of this disclosure. Method 600 includes operations performed by processors of a computing device (e.g., any component (server 128) of database system 116 of FIG. 1) implementing the method 600. In some embodiments, one or more operations of the method 600 are implemented in computer instructions that stored on a memory device and executed by a processing device. The method 600 may be performed in the same or a similar manner as described above in regards to method 400. Various operations of the method 600 may be performed in combination with the operations of the method 400 in FIG. 4 and/or the operations of the method 500 in FIG. 5 described above.

At block 602, a processing device may store a run date for when the stored procedure is executed at the first time (as described above with reference to the method 400 depicted in FIG. 4). The run date may include a timestamp of when the stored procedure last previously executed.

At block 604, the processing device may receive, at a second time, a second instruction to execute the stored procedure based on the schedule, the second time being subsequent to the first time. The processing device may retrieve the schema of the structure of the database used by the management system 150 of the client entity (the same client entity as in FIG. 4). The processing device may determine the identity of the management system and the type of data to retrieve for the client entity. Responsive to determining the identity of the management system and the type of data to retrieve for the client entity, the processing device may determine the criteria to use in a second dynamic query based on the identity of the management system and the type of data to retrieve for the client entity. In some embodiments, the criteria used in the second dynamic query may be the same as the criteria used in the dynamic query described above with reference to FIG. 4 when the identity of the management system and the type of data to retrieve are the same at the first time when the instruction is received and at the second time when the second instruction is received.

At block 606, the processing device may generate a second dynamic query to include in the stored procedure, the second dynamic query to transform second raw data 151 from the database used by the management system 150 of the client entity to second transformed data 111 using the criteria. The second raw data 151 is created after the last run date the stored procedure executed the first time.

The processing device may execute the stored procedure to retrieve the second raw data 151 and to transform the second raw data 151 to the second transformed data 111 using the criteria. The processing device may store the transformed data 111 in a second database used by the content management system 105 such that reports, analysis, predictions, and the like may be performed on the transformed data 111.

Figure 7:
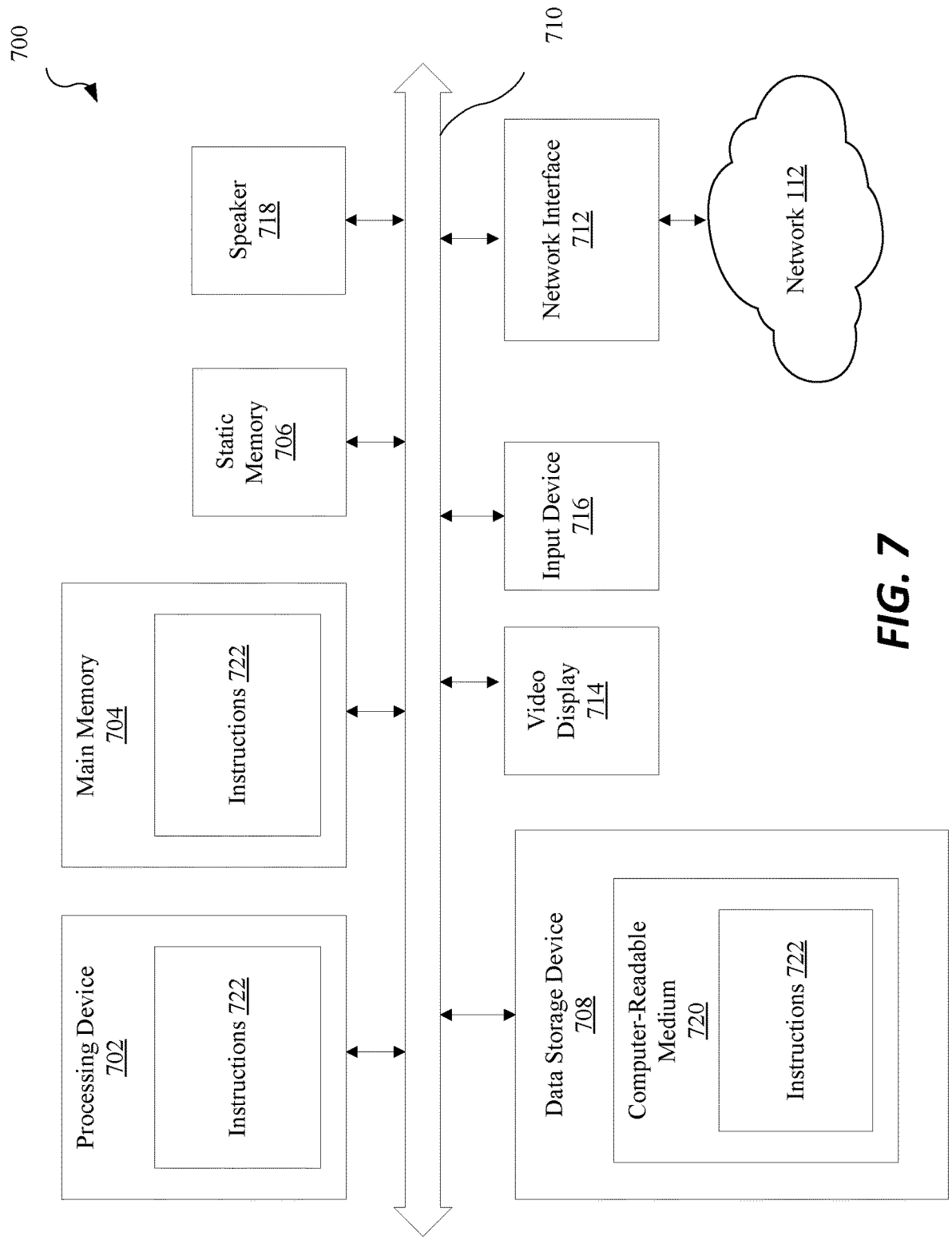
FIG. 7 illustrates an example computer system.

FIG. 7 illustrates an example computer system 700, which can perform any one or more of the methods described herein. In one example, computer system 700 may correspond to the computing device 101, the computing device 102, one or more servers 128 of the database system 116, or one or more training engines 152 of the database system 116 of FIG. 1. The computer system 700 may be capable of executing the management system 150, the content management system 105, and/or hosting the database 130 of FIG. 1. The computer system 700 may be connected (e.g., networked) to other computer systems in a LAN, an intranet, an extranet, or the Internet. The computer system 700 may operate in the capacity of a server in a client-server network environment. The computer system 700 may be a personal computer (PC), a tablet computer, a wearable (e.g., wristband), a set-top box (STB), a personal Digital Assistant (PDA), a mobile phone, a camera, a video camera, or any device capable of executing a set of instructions (sequential, parallel, or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 700 includes a processing device 702, a main memory 704 (e.g., read-only memory (ROM), solid state drive (SSD), flash memory, dynamic random access memory (DRAM) such as synchronous DRAM (SDRAM)), a static memory 706 (e.g., solid state drive (SSD), flash memory, static random access memory (SRAM)), and a data storage device 708, which communicate with each other via a bus 710.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions for performing any of the operations and steps discussed herein.

The computer system 700 may further include a network interface device 712. The computer system 700 also may include a video display 714 (e.g., a liquid crystal display (LCD) or a cathode ray tube (CRT)), one or more input devices 716 (e.g., a keyboard and/or a mouse), and one or more speakers 718 (e.g., a speaker). In one illustrative example, the video display 714 and the input device(s) 716 may be combined into a single component or device (e.g., an LCD touch screen).

The data storage device 716 may include a computer-readable medium 720 on which the instructions 722 embodying any one or more of the methodologies or functions described herein are stored. The instructions 722 may also reside, completely or at least partially, within the main memory 704 and/or within the processing device 702 during execution thereof by the computer system 700. As such, the main memory 704 and the processing device 702 also constitute computer-readable media. The instructions 722 may further be transmitted or received over a network 112 via the network interface device 712.

While the computer-readable storage medium 720 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The invention claimed is:

1. A method comprising:
    receiving, at a first time, an instruction to execute a stored procedure at a database system;
    retrieving a schema of a structure of a database associated with a management system of a plurality of management systems;
    determining an identity of the management system and a type of data, wherein the type of data is specified in the schema;
    responsive to determining the identity of the management system and the type of data, determining a dynamic query criteria, wherein determining the dynamic query criteria comprises:
        inputting the schema into a trained machine learning model; and
        receiving, as output from the trained machine learning model, the dynamic query criteria;
    generating, in the stored procedure, a dynamic query comprising the dynamic query criteria based on assigning a value to a parameter in the dynamic query;
    establishing a secure network connection between the database system and the management system; and
    executing the stored procedure comprising the dynamic query, wherein executing the stored procedure comprises:
        retrieving, via the secure network connection, raw data from the database associated with the management system; and
        transforming the raw data to transformed data associated with the dynamic query criteria.

2. The method of claim 1, further comprising:
    retrieving a second schema of a second structure of a second database used by the management system of a second client entity;
    determining the identity of the management system and the type of data to retrieve for the second client entity, wherein the type of data to retrieve for the second client entity is specified in the second schema;
    responsive to determining the identity of the management system and the type of data to retrieve for the second client entity, determining a second criteria to use in a second dynamic query based on the identity of the management system and the type of data to retrieve for the second client entity;
    responsive to determining the second criteria, generating, in the stored procedure, the second dynamic query comprising the second criteria;
    retrieving second raw data from the database used by the management system of the second client entity; and
    transforming the second raw data to second transformed data using the second dynamic query.

3. The method of claim 2, wherein generating the second dynamic query comprises assigning a second value to a second parameter in the second dynamic query with the second criteria.

4. The method of claim 2, wherein the dynamic query criteria and the second criteria are different.

5. The method of claim 2, wherein the dynamic query criteria and the second criteria are the same.

6. The method of claim 2, wherein:
    the schema and the second schema are different, and
    the retrieving of the raw data and the second raw data, and transforming of the raw data and the second raw data to the transformed data and the second transformed data, respectively, are performed during execution of the stored procedure.

7. The method of claim 2, further comprising executing the dynamic query and the second dynamic query using a workflow designed to execute the dynamic query and the second dynamic query in parallel to transform the raw data to the transformed data and the second raw data to the second transformed data.

8. The method of claim 1, wherein the instruction is received periodically based on a schedule, and the method further comprising:
    storing a run date for when the stored procedure is executed;
    receiving, at a second time, a second instruction to execute the stored procedure based on the schedule, the second time being subsequent to the first time;
    generating a second dynamic query to include in the stored procedure, the second dynamic query to transform second raw data from the database used by the management system of the client entity to second transformed data using dynamic query the criteria, wherein the second raw data is created after the run date the stored procedure executed the first time; and executing the stored procedure to retrieve the second raw data and to transform the second raw data to the second transformed data using the dynamic query criteria.

9. The method of claim 1, wherein executing the stored procedure further comprises storing the transformed data in a second database of the client entity.

10. A non-tangible, computer-readable medium storing instructions that, when executed, cause a processing device to:
receive, at a first time, an instruction to execute a stored procedure at a database system;
retrieve a schema of a structure of a database associated with a management system of a plurality of management systems;
determine an identity of the management system and a type of data, wherein the type of data is specified in the schema;
responsive to determining the identity of the management system and the type of data, determine a dynamic query criteria, wherein determining the dynamic query criteria comprises:
inputting the schema into a trained machine learning model; and
receiving, as output from the trained machine learning model, the dynamic query criteria;
generate, in the stored procedure, a dynamic query comprising the dynamic query criteria based on assigning a value to a parameter in the dynamic query;
establish a secure network connection between the database system and the management system; and
execute the stored procedure comprising the dynamic query, wherein executing the stored procedure comprises:
retrieving, via the secure network connection, raw data from the database associated with the management system; and
transforming the raw data to transformed data associated with the dynamic query criteria.

11. The computer-readable medium of claim 10, wherein the processing device is further to:
retrieve a second schema of a second structure of a second database used by the management system of a second client entity;
determine the identity of the management system and the type of data to retrieve for the second client entity;
responsive to determining the identity of the management system and the type of data to retrieve for the second client entity, determine a second criteria to use in a second dynamic query based on the identity of the management system and the type of data to retrieve for the second client entity;
responsive to determining the second criteria, generate, in the stored procedure, a second dynamic query comprising the second criteria;
retrieving second raw data from the database used by the management system of the second client entity; and
transform the second raw data to second transformed data using the second dynamic query.

12. The computer-readable medium of claim 11, wherein generating the second dynamic query comprises the processing device assigning a value to a parameter in the second dynamic query with the second criteria.

13. The computer-readable medium of claim 11, wherein the dynamic query criteria and the second criteria are different.

14. The computer-readable medium of claim 11, wherein the dynamic query criteria and the second criteria are the same.

15. The computer-readable medium of claim 11, wherein the processing device is further to execute the dynamic query and the second dynamic query using a workflow designed to execute the dynamic query and the second dynamic query in parallel to transform the raw data to the transformed data and the second data to the second transformed data.

16. The computer-readable medium of claim 11, wherein the instruction is received periodically based on a schedule, and the processing device is further to:
store a run date for when the stored procedure is executed.

17. The computer-readable medium of claim 11, wherein to execute the dynamic query, the processing device is further to:
store the transformed data in a second database.

18. A database system, comprising:
a memory device storing instructions;
a processing device communicatively coupled to the memory device, wherein the processing device executes the instructions to:
receive, at a first time, an instruction to execute a stored procedure at a database system;
retrieve a schema of a structure of a database associated with a management system of a plurality of management systems;
determine an identity of the management system and a type of data, wherein the type of data is specified in the schema;
responsive to determining the identity of the management system and the type of data, determine a dynamic query criteria, wherein determining the dynamic query criteria comprises:
inputting the schema into a trained machine learning model; and
receiving, as output from the trained machine learning model, the dynamic query criteria;
generate, in the stored procedure, a dynamic query comprising the dynamic query criteria based on assigning a value to a parameter in the dynamic query;
establish a secure network connection between the database system and the management system; and
execute the stored procedure comprising the dynamic query, wherein executing the stored procedure comprises:
retrieving, via the secure network connection, raw data from the database associated with the management system; and
transforming the raw data to transformed data associated with the dynamic query criteria.

* * * * *